United States Patent [19]

Kawase et al.

[11] Patent Number: 5,132,533
[45] Date of Patent: Jul. 21, 1992

[54] METHOD FOR FORMING PROBE AND APPARATUS THEREFOR

[75] Inventors: Toshimitsu Kawase, Atsugi; Akihiko Yamano, Yokohama; Hiroyasu Nose, Zama; Toshihiko Miyazaki, Hiratsuka; Takahiro Oguchi; Ryo Kuroda, both of Atsugi, all of Japan

[73] Assignee: Canon Kabushiki Kaisha, Tokyo, Japan

[21] Appl. No.: 621,886

[22] Filed: Dec. 5, 1990

[30] Foreign Application Priority Data

Dec. 8, 1989 [JP] Japan .................................. 1-317468
Jul. 9, 1990 [JP] Japan .................................. 2-179557

[51] Int. Cl.⁵ ........................... G01N 23/00; G01B 7/34
[52] U.S. Cl. .................................. 250/306; 250/307; 250/310
[58] Field of Search ........................ 250/306, 307, 310

[56] References Cited

U.S. PATENT DOCUMENTS 4,343,993 10/1982 Binnig et al. ...................... 250/306
4,998,016 3/1991 Nose et al. ........................ 250/306

FOREIGN PATENT DOCUMENTS 62-209302 3/1988 Japan .
0265101 11/1988 Japan .................................. 250/306
0265102 11/1988 Japan .................................. 250/306

*Primary Examiner*—Jack L. Berman
*Assistant Examiner*—James Beyer
*Attorney, Agent, or Firm*—Fitzpatrick, Cella, Harper & Scinto

[57] ABSTRACT

A probe closely positioned to an information carrier in apparatus to effect information reading and/or input on the information carrier is formed by opposing an electrode to an end portion of the prove to be formed. The distance between probe end portion and the electrode is detected to control the position of the electrode with respect to the probe. A voltage is applied to the probe end portion through the electrode under positioning control to form the probe end portion. The probe end portion is formed and may be reformed to maintain reliable performance of the information reading and/or input apparatus.

26 Claims, 15 Drawing Sheets

BEFORE APPLICATION OF PULSE VOLTAGE

AFTER APPLICATION OF PULSE VOLTAGE

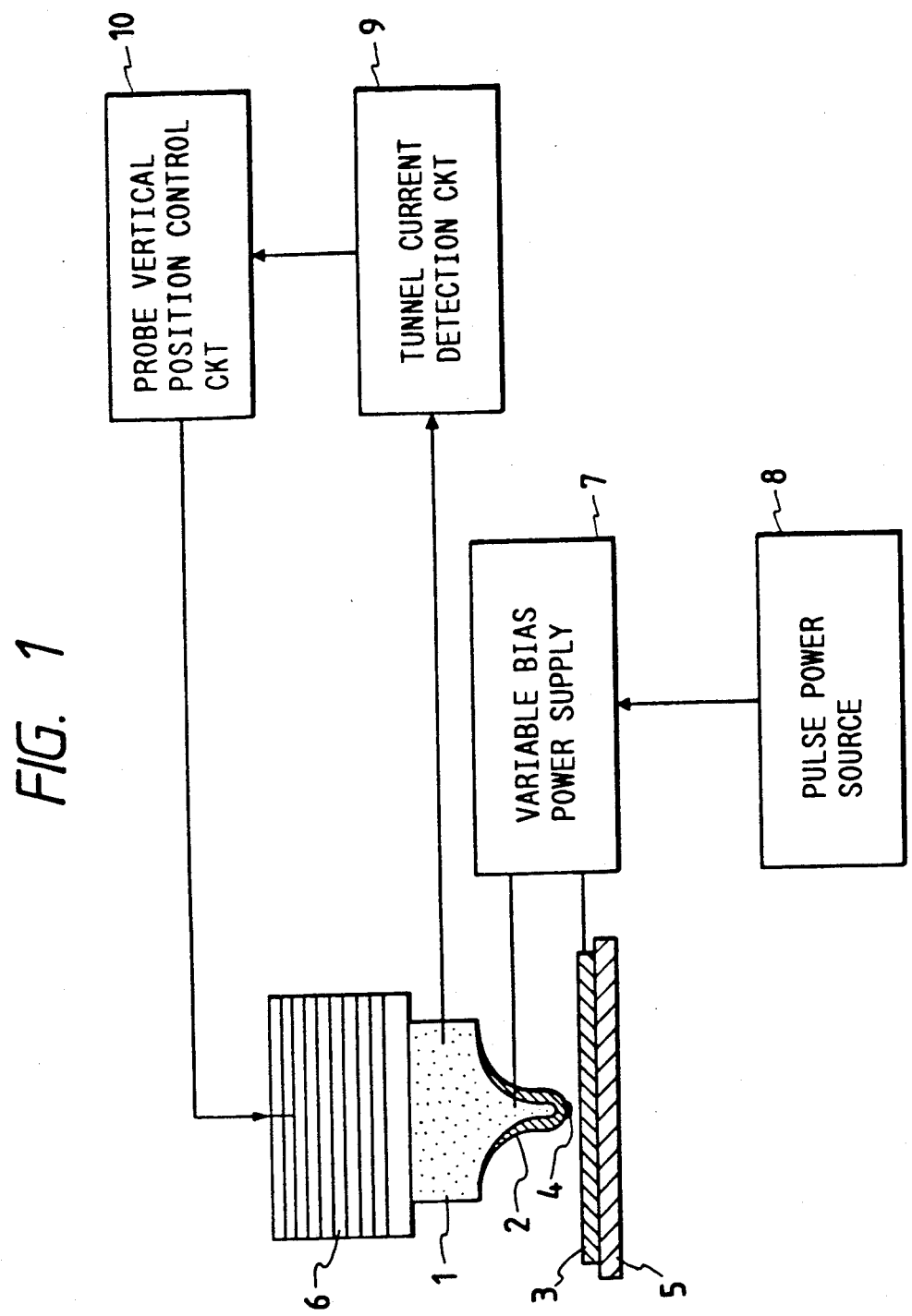

BEFORE APPLICATION
OF PULSE VOLTAGE

AFTER APPLICATION
OF PULSE VOLTAGE

BEFORE APPLICATION OF PULSE VOLTAGE

AFTER APPLICATION OF PULSE VOLTAGE

BEFORE APPLICATION OF PULSE VOLTAGE

AFTER APPLICATION OF PULSE VOLTAGE

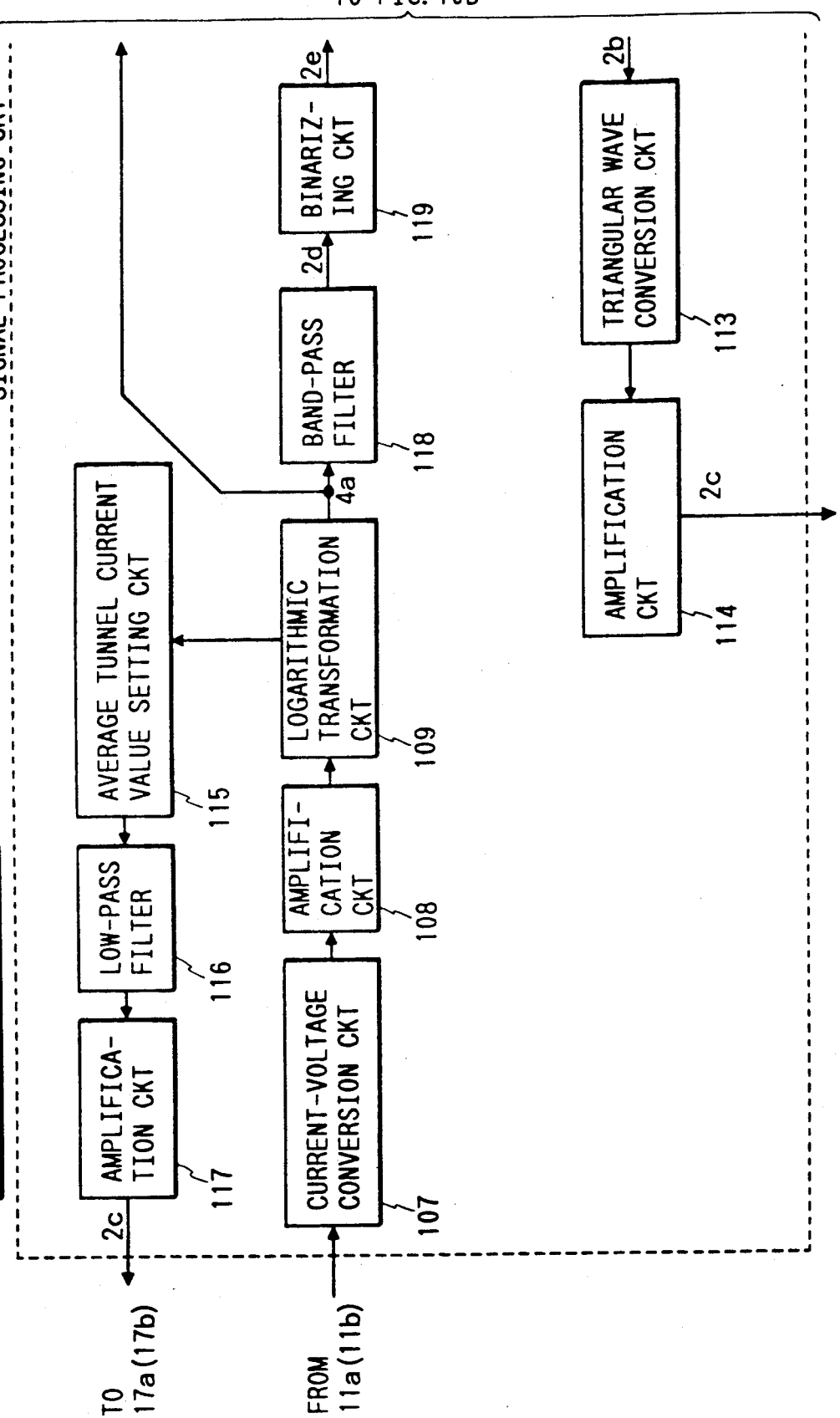

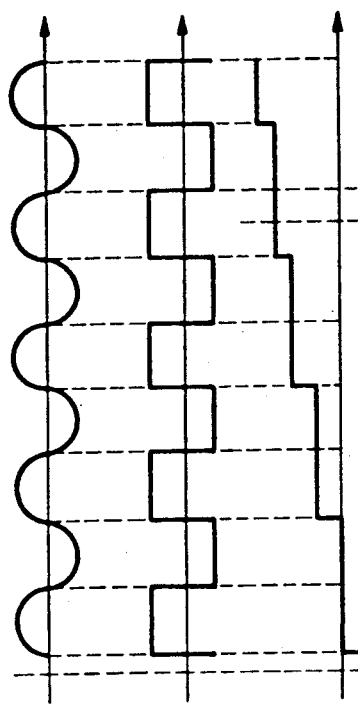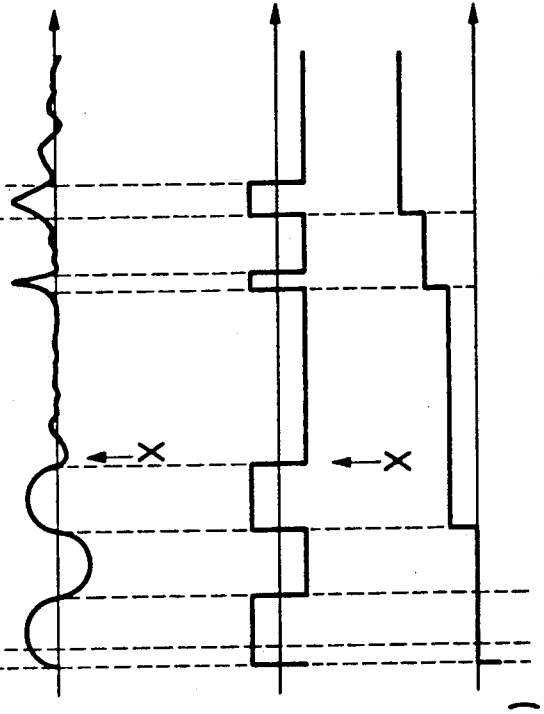
FIG. 13

BEFORE APPLICATION OF PULSE VOLTAGE

AFTER APPLICATION OF PULSE VOLTAGE

METHOD FOR FORMING PROBE AND APPARATUS THEREFOR

BACKGROUND OF THE INVENTION

1. Field of the Invention

The present invention relates to a method for forming a probe of an information reading and/or input apparatus, an apparatus therefor, and an information reading and/or input apparatus equipped with a mechanism for reforming the probe. Such information reading and/or input apparatus is utilized, for example, in a surface observing apparatus such as a scanning tunnel microscope (STM), a high-density record/reproducing apparatus capable of recording and reading information in the size of atomic order (several Angstroms), an encoder for fine positioning, measurement of dimension or distance, positional measurement for speed measurement, particularly measurement and control requring a resolving power of atomic order, or the like.

Recent development of the scanning tunnel microscope capable of directly observing the electronic structure of the surface of a substance or in the vicinity of the surface [G. Binning et al., Helvetica Physica Acta, 55, 726 (1982)] has enabled to measure the real space image with a high resolving power, both in the monocrystalline and amorphous substances. Applications of a wide range are expected for such scanning tunnel microscope, as it is usable for various materials, allowing observation with a low electric power without damage to the specimen by the electric current and being capable of functioning not only in high vacuum but also in air or in solution.

The scanning tunnel microscope is based on a current generated between a metal probe and a conductive material when they are brought to a small distance of about 1 nm, with a voltage therebetween. Said current is very sensitive to the change in the distance of both members, and the surface information of real space can only be obtained by moving the probe in scanning motion so as to maintain said current or the average distance of both members constant. In such case a resolving power of 1 Å or less can be obtained in the direction along the surface.

In the conventional ordinary scanning tunnel microscopes, there is employed a method of detecting the tunnel current flowing between the surface of conductive specimen and the pointed end of the detecting conductive probe (probe electrode), effecting electric feedback control on the distance between the specimen surface and the detecting probe so as to maintain a constant tunnel current, and displaying the structure of atoms and molecules as an image. The resolving power of such scanning tunnel microscope is determined by the radius of curvature of the pointed end of the probe. For improving the resolving power, therefore, the pointed end of the probe has to be made sharper.

On the other hand, the recording capacity in data recording apparatus has been increasing year after year, and such tendency calls for reduction in size of the recording unit and increase in the density thereof. For example, in the digital audio disk utilizing optical recording, the recording unit has been reduced as small as about 1 $\mu m^2$.

The above-explained principle of the scanning tunnel microscope can be utilized in realizing information recording with a recording unit of 0.001 $\mu m^2$ or smaller, by employing a material with memory effect for the voltage-current switching such as a thin film of an organic compound with $\pi$-electron system or a charcogenide, as the recording medium. An apparatus for high-density information recording and reproduction with such recording medium is generally equipped with a vernier control mechanism or an X-Y stage for maintaining a probe electrode at a small distance of about several nanometers to the recording layer and mutually moving said probe electrode and recording layer, in order to effect the recording and reproduction in an arbitrary position in the recording layer.

For achieving high-density recording and reproduction, there are required not only a recording medium with small recording unit, but also a probe electrode of which pointed end, governing the resolving power in the direction of recording layer, sharpened to the atomic or molecular level.

Thus, in an observing system such as the scanning tunnel microscope for observing a specimen with a resolving power of atomic order or in a high-density information record/reproducing apparatus in the atomic order utilizing the principle of such scanning tunnel microscope, the pointed end of the probe electrode has to be made very sharp.

For this reason, the probe electrode is generally composed of a platinum or tungsten rod of which an end is pointed in a conical shape by mechanical polishing or electrolytic polishing.

However, in the actual operation of such surface observing apparatus or information record/reproducing apparatus, the pointed probe electrode may be brought into contact with the information bearing member such as the observed specimen or recording medium, as they are maintained at a very short distance of several nanometers. Also in the operation in the air, the pointed end of the probe electrode may be contaminated by the dusts in the air. In such case the probe electrode loses the resolving power of atomic or molecular level, and there will result a loss in the resolving power or recording density of the entire apparatus, in the reliability and overall performance thereof. It therefore becomes necessary to replace or regenerate the probe electrode. The replacement is made with a probe electrode formed in advance by electrolytic polishing or electrolytic discharge forming. Also for regeneration, there are known a method of applying a strong electric field while heating the pointed end portion of the probe in a vacuum chamber as disclosed in the Japanese Laid-open Patent Application No. 63-265101 and a method of effecting electrolytic evaporation in an ultra high vacuum chamber.

However, such conventional methods have been associated with a drawback that the formed or regenerated shape of probe inevitably fluctuates, so that the resolving power in the surface observation with the scanning tunnel microscope or in the recording and reproduction of the information record/reproducing apparatus varies depending on the mounted electrode or on each regeneration.

A third example utilizing a probe electrode pointed to atomic order is the encoder mentioned above.

Conventional encoders have a reference scale having positional or angular information and detecting means for detecting said positional or angular information by relative movement to said reference scale, and are classified into several types, such as optical, magnetic and electrostatic capacitative encoders, by the systems employed in said reference scale and detecting means.

Also as an encoder with resolving power of atomic order, there is already known an apparatus for detecting the amount of parallel displacement disclosed in the Japanese Laid-Open Patent Application No. 62-209302 and utilizing the basic principle of the scanning tunnel microscope disclosed in the U.S. Pat. No. 4,343,993.

Such encoder is equipped with a reference scale for length and a probe positioned close to said reference scale, and has a function of obtaining the current generated between the reference scale and the probe which are provided with a driving mechanism, and encoding thus obtained information on said current.

The probe for detecting the tunnel current in said encoder is generally composed of a sharp needle formed by known electrolytic polishing method. Also mechanical polishing may be used for this purpose.

The performance of the probe with sharpness of atomic order for detecting the tunnel current is the heart of the encoder and is directly related to the performance of the encoder. However, in order to detect the tunnel current of pA - nA order generated between the reference scale and the probe, the distance therebetween has to be maintained as small as several nanometers, so that there may result mutual contact by eventual vibration of floor or by noises. The pointed end of the probe will be damaged by such contact and will lose the ability of length measurement of the atomic order. Also the replacement or regeneration of such probe results in the aforementioned drawback that the resolving power fluctuates depending on said replacement or regeneration.

SUMMARY OF THE INVENTION

In consideration of the foregoing, an object of the present invention is to maintain a stable resolving power even after the replacement or regeneration of the probe, in an observing apparatus, an information record/reproducing apparatus or an information reading and/or input apparatus for information reading and/or input with a probe on an information bearing member such as an observed specimen, a recording medium or a reference scale, thereby improving the precision and stability of such apparatus.

Other objects of the present invention will become fully apparent from the following detailed description of embodiments of the present invention.

BRIEF DESCRIPTION OF THE DRAWINGS

FIG. 1 is a schematic view of surface detecting means utilizing a fine probe of the present invention;

FIGS. 11, 12 and 13 are wave form charts of signals obtained in said signal processing circuit.

DETAILED DESCRIPTION OF THE PREFERRED EMBODIMENTS

Figure 2A:
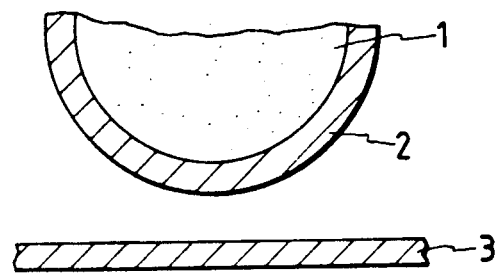
FIGS. 2A and 2B are schematic views of a minute projection formed on the end of the fine probe of the present invention.

Now the present invention will be clarified in greater detail by embodiments thereof shown in the attached drawings.

1ST EMBODIMENT

FIG. 1 schematically shows the structure, including the electric block diagram, of a first embodiment of the present invention. There are shown a conductive probe 1 composed for example of tungsten, platinum, platinum-rhodium or platinum-iridium and pointed at an end by electrolytic polishing or mechanical polishing; a conductive probe covering 2 composed of a conductive material deposited for example by sputtering or plating; a conductive specimen 3; a minute projection (end of probe) 4, formed as will be explained later on the end of the conductive probe 1 covered with the conductive probe covering 2; a substrate 5 for fixing the conductive specimen 3; vertical position control means 6 for controlling the distance between the conductive probe 1 and the conductive specimen 3; a variable bias power supply 7 for sweep application of a bias voltage between the conductive probe 1 and the conductive specimen 3; a pulse power source 8 for varying the bias voltage; a tunnel current detecting circuit 9 for detecting the tunnel current between the conductive probe 1 and the conductive specimen 3; and a vertical probe position control circuit 10 for controlling the vertical position control means 6. In the present embodiment, for controlling the distance between the probe and the specimen, the tunnel current is utilized for detecting said distance, but there may be employed other means such as interatomic force, magnetic force or electrostatic force for this purpose. In the following there will be given a detailed explanation on the method for forming the minute projection in the above-explained structure, with reference to FIGS. 1, 2A and 2B.

Figure 2B:
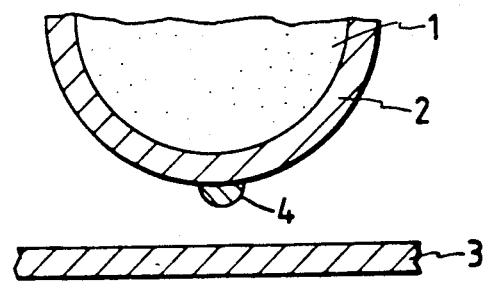

The conductive probe 1 was composed of tungsten, and was sharpened with ordinary electrolytic polishing. The radius of curvature of the end of said probe was about 0.1 micrometers. The surface of the probe 1 prepared by electrolytic polishing was covered with gold, with a thickness of about 10 nanometers, by an ion beam sputtering apparatus. The conductive specimen 3 was composed of a platinum evaporated film. The vertical position control means 6 was composed of a commercially available PZT element, with a displacement of 1 $\mu$m/1000 V. In the above-explained structure, the covering 2 of the probe 1 and the specimen 3 were maintained at a distance of several nanometers, by detecting said distance with the tunnel current detecting circuit 9, and sending an instruction signal from the vertical probe position control circuit 10 to the control means 6 according to the result of said detection. In order to prevent eventual change in the distance between the probe 1 and the specimen 3 due to external perturbations such as temperature drift or external vibrations, an electric feedback control was applied to the vertical probe position control circuit 10 and the vertical position control means 6, according to the output of the detecting circuit 9. The apparatus was placed in the air. In this state a pulse of a duration of 4 μs and a height of 4 V was supplied from the pulse source 8 to the variable bias voltage source 7 supplying a positive voltage to the probe, thereby forming a minute projection 4 as shown in FIG. 1 or 2B, with a height of about 10 nm and an area of about 15 nm$^2$ at the base.

The materials for the probe, probe covering and specimen are not limited to those explained about but can be suitably selected, as long as the melting point of the specimen is higher than that of the probe covering.

Also the conditions of the pulse can be suitably selected according to the size of the minute projection to be formed, but should be so selected as not to damage the probe covering and the specimen.

The formation of the above-explained minute projection allows to provide a fine probe capable of resolving a molecular state both in vacuum and in the air. Also the selection of a suitable material not causing damage to the specimen in the pulse voltage application allows to easily regenerate, within the structure of the scanning tunnel microscope, a minute projection with a resolving power of atomic or molecular level even for a probe which has lost its resolving power by eventual contact with the specimen in the operation of the scanning tunnel microscope.

2ND EMBODIMENT

Figure 3A:
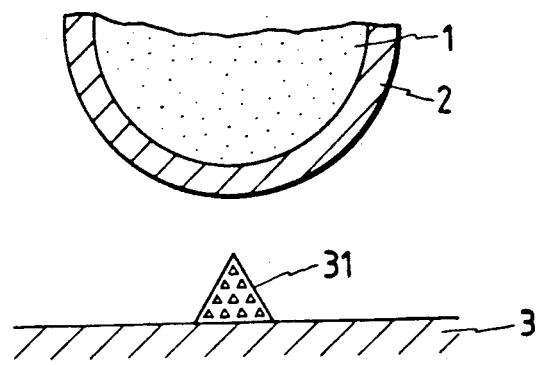
FIGS. 3A and 3B are schematic view showing another method for forming the minute projection on the end of the fine probe of the present invention.
Figure 3B:
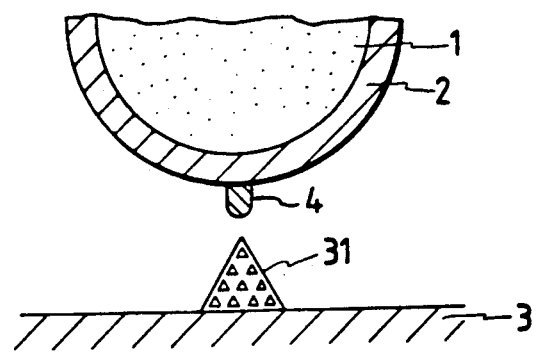

In the following there will be explained a 2nd embodiment of the present invention, with reference to FIGS. 3A and 3B. This embodiment is different from the 1st embodiment only in the structure of the specimen 3, which is provided with a projection 31 with a pointed end, prepared in advance by a suitable known method. The method of forming the minute projection 4 is same as in the 1st embodiment, but the presence of the pointed projection 31 creates a more concentrated electric field, at the application of the pulse voltage, in comparison with the planar specimen. It is therefore possible to obtain a minute projection 4 with a smaller radius of curvature than that of the projection 4 obtained in the 1st embodiment (FIGS. 1, 2A and 2B).

Formation of a minute projection with a smaller radius of curvature on the end of the conductive probe, by applying a voltage between said probe and a conductive substrate while they are maintained at a small mutual distance, provides an effect of higher resolving power, due to said smaller radius of curvature.

The above-explained embodiment allows to form, on the end of a probe with a pointed end of a radius of curvature of 0.1 microns, a minute projection of an even smaller radius of curvature in a simple process by means of an apparatus of the structure of a scanning tunnel microscope either in vacuum or in the air, thereby providing a fine probe with a resolving power of atomic or molecular level with a simple method, and being therefore greatly effective in the improvement of performance, compactization of manufacturing apparatus and simplification of manufacturing method.

As the probe formation is achieved by voltage application after detection and control of the distance between an electrode and the location of probe formation, the distance at the probe formation can be precisely controlled and a desired form can be precisely obtained. The voltage application with a stably constant distance provides constant forming conditions, thereby enabling to obtain a constant shape in the formed probe.

Following embodiment describes an information reading and/or input apparatus equipped with a probe re-forming mechanism.

3RD EMBODIMENT

Figure 4:
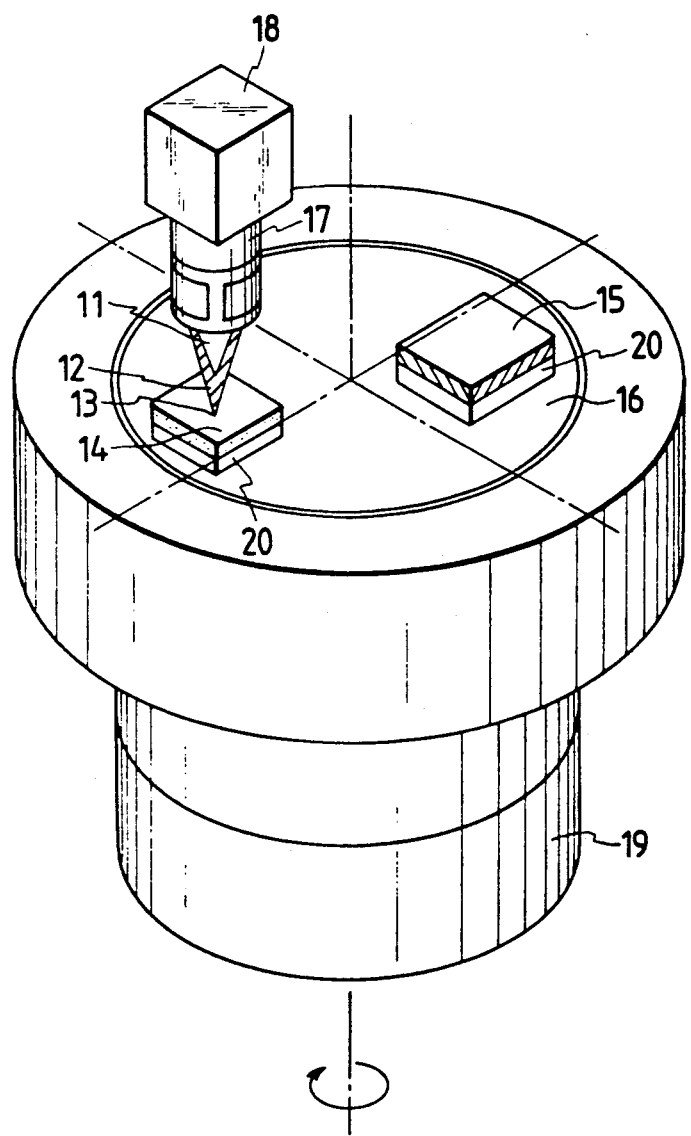
FIG. 4 is a perspective view of a unit commonly employed in an observing apparatus and a record/reproducing apparatus constituting 3rd and 4th embodiments of the present invention.
Figure 5:
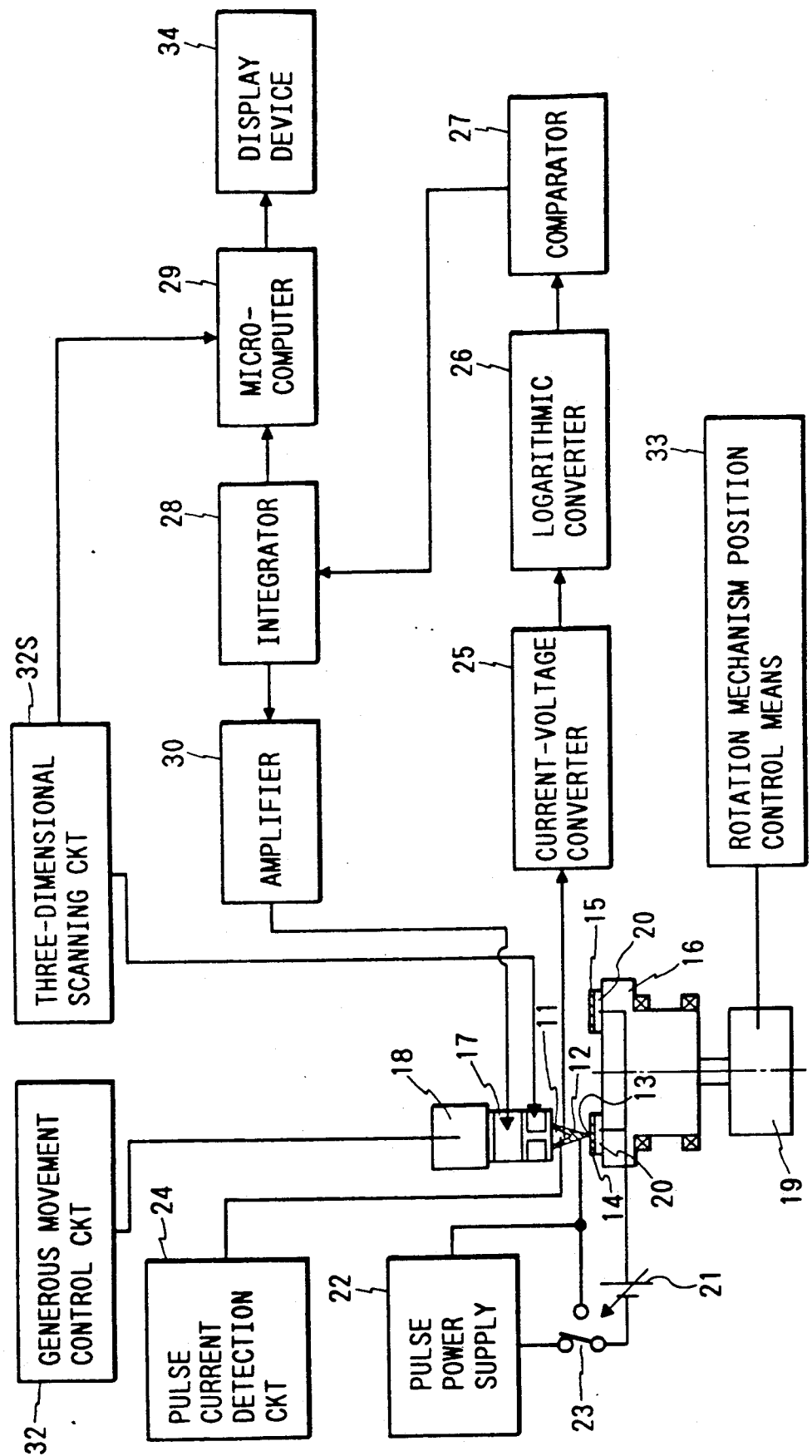
FIG. 5 is an electric block diagram of the apparatus shown in FIG. 4.
Figure 6A:
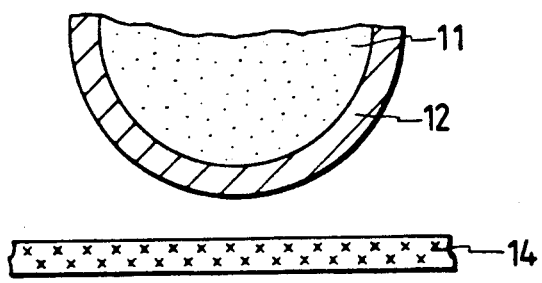
FIGS. 6A and 6B are magnified views of the end portion of the probe of the apparatus shown in FIG. 4.

FIGS. 4, 5 and 6 show a surface observing apparatus constituting an embodiment of the present invention.

Referring to FIG. 4, there are shown a conductive probe (probe electrode) 11 composed of a conductive material such as tungsten, platinum, platinum-iridium or platinum-rhodium and pointed at an end by electrolytic or mechanical polishing; a conductive probe covering 12 composed of a conductive material deposited by sputtering or plating; a minute projection 13 formed on the end of the conductive probe 11 covered with the conductive covering 12; a probe regenerating electrode 14 for forming said minute projection 13; a specimen 15 of which surface is to be observed with the conductive probe 11; a rotary specimen support member 16 for rotatably supporting the probe regenerating electrode 14 and the specimen 15; a vernier cylindrical piezoelectric element 17 for three-dimensionally moving the probe 11 in the vertical direction; a generous positioning piezoelectric element 18 for positioning the probe 11 upto a distance of several nanometers from the electrode; a rotating mechanism 19 for rotating the rotary specimen support member 16; and a substrate 20 for supporting the probe regenerating electrode 14 and the specimen 15.

Then referering to FIG. 5, there are shown a bias power source 21; a pulse power source 22; a relay circuit 23; a pulse current detecting circuit 24; a current-voltage converter 25; a logarithmic converter 26; a comparator 27; an integrator 28; a microcomputer 29; an amplifier 30; a three-dimensional scanning circuit 32S for controlling the vernier cylindrical piezoelectric element 17 thereby causing three-dimensional movement of the probe 11; a generous movement control circuit 32 for causing the probe to approach to the electrode; a rotating mechanism controlling means 33 for rotation and position control of the rotating mechanism 19; and a display device 34.

FIG. 6 is a detailed enlargedly view of the probe 11 and the probe regenerating electrode 14.

The surface observing apparatus capable of repairing the deterioration or damage at the end of the probe by the above-explained structure will be explained in more detail in the following, with reference to FIGS. 4, 5, and 6.

The probe regenerating electrode 14 of the present invention is provided on the substrate 20, at a position separate from the center of the rotary specimen support member 16. The probe regenerating electrode 14 was composed of a platinum evaporated film. The substrate 20 was composed of a Corning #7059 glass plate. The specimen 15 to be observed was placed on the substrate 20, at a position symmetrical to the probe regenerating electrode 14 with respect to the center of the support member 16. The specimen 15 was composed of highly oriented graphite, of which a clean surface obtained by cleavage was observed.

In the following there will be explained the end portion of the probe 11, on which the minute projection 13 is to be formed. The probe 11 was composed of tungsten, and was sharpened by ordinary electrolytic polishing, with a radius of curvature of 0.1 microns at the end. The end portion of the probe 11, prepared by electrolytic polishing, was then covered with gold, with a thickness of about 10 nanometers, by an ion beam sputtering apparatus.

The surface observing apparatus of the present embodiment explained above was operated in the air. In order to maintain the distance between the probe 11 and the probe regenerating electrode 14 at a constant value of several nanometers, an electric feedback signal was given to the vernier cylindrical piezoelectric element 17 through the current-voltage converter 25, logarithmic converter 26, comparator 27, integrator 28 and amplifier 30, with an output voltage of 100 mV from the bias power source 21. The displacement of the cylindrical piezoelectric element 17 was 1 micron per 1 kV. Tunnel current was utilized for detecting the distance between the probe 11 and the probe regenerating electrode 14 or the specimen 15. With said electric feedback applied to the vernier cylindrical piezoelectric element 17, conditions of a pulse duration of 4 microseconds and a pulse height of 4 V were given to the pulse power source 22 to form a minute projection 13 as shown in FIG. 3B, with a height of 10 nanometers and an area of 15 nm$^2$ at the base. The mechanism of formation of said minute projection 13 is presumably due to instantaneous fusing and cooling of the material induced by the application of a high-voltage pulse, or due to formation of a heaped shape as a stable state after cleavage of atomic or molecular chains, but the present inventors support the former thermal mechanism, since the Joule's heat given to the end portion of the probe 11 as a result of pulse voltage application is considerably large. Consequently the materials for said probe, probe covering and electrode are not limited to those mentioned above but can be suitably selected, as long as the melting point of the probe covering is higher than that of the electrode.

Since electric feedback control is so conducted that the detected tunnel current becomes equal to a predetermined value, the distance between the probe 11 and the electrode 14 is precisely maintained at a predetermined value, and the shape of the minute projection can be maintained constant by effecting such control at each probe formation or regeneration.

After the formation of the minute projection 13 on the end of the probe 11 in the above-explained manner, the distance between the probe 11 and the probe regenerating electrode 14 is widened to about 5 microns by means of the generous movement piezoelectric element 18 (displacement: 10 microns per 100 V) and the generous movement control circuit 32. Then the rotary specimen support table 16 is rotated by 180° by means of the rotating mechanism 19 and the position control means 33 so as that the specimen 15 faces the probe 11, and the generous movement piezoelectric element 18 and the vernier cylindrical piezoelectric element 17 are activated to effect electric control, with detection of the tunnel current, in such a manner that the distance between the minute projection 13 and the specimen 15 is maintained at about several nanometers.

Then, under an electric feedback so as to maintain a constant distance between the minute projection 13 and the specimen 15 to be observed, the movement of the probe 11, or the surface shape of the specimen 15, is converted into an image by the microcomputer 29 and displayed on the display device 34, based on the driving voltages for the generous movement piezoelectric element 18 and the vernier cylindrical piezoelectric element 17. It was thus confirmed that the image of atoms of the highly oriented graphite could be obtained with a high resolving power. Also in the course of observation of said image, the minute projection 13 at the end of the probe 11 was damaged by an accidental external vibration and the probe became unable to provide the atomic image of the graphite.

For this reason a process for regenerating the minute projection 13 at the end of the probe 11 became necessary. For this purpose of distance between the probe 11 and the specimen 15 was widened to about 5 microns by the generous movement piezoelectric element 18, and the rotary specimen support table 16 was rotated 180° by the rotating mechanism 19 to bring the probe regenerating electrode 14 to a position opposed to the probe 11. In this state the minute projection 13 could be regenerated by pulse voltage application in the same manner as in the initial formation of the minute projection 13.

A surface observing apparatus with a probe regenerating function of the present invention could be obtained with the above-explained components, materials and electric circuitry. The pulse for probe regeneration was defined by a height of 4 V and a duration of 4 microseconds, but these parameters are suitably selectable according to the materials of the probe covering and the probe regenerating electrode, and are not limited to those described in the present embodiment.

Also the above-explained embodiment has been limited to the application of the surface observing apparatus to a scanning tunnel microscope, but the present invention is not limited to such application and is naturally applicable to other observing apparatus such as AFM.

As explained in the foregoing, the present embodiment provides significant advantages of achieving a higher resolving power of the probe through the reduction in the radius of curvature at the end of the probe, and incorporating a non-thermal regenerating mechanism capable of preventing deterioration or damage of the probe or the specimen to be observed, thereby improving the performance and reproducibility of the apparatus in a simple manner.

4TH EMBODIMENT

The above-explained observing apparatus can be utilized as an information record/reproducing apparatus by replacing the specimen to be observed with a recording medium and by adding a recording voltage, according to the recording information, to the pulse power source 22.

Following embodiment employs a recording medium 15 consisting of 8 LB films, superposedly formed on a graphite substrate, of squalirium-bis-6-octylazulene showing memory effect to voltage-current switching.

At first there will be explained the end portion of the probe 11, on which the minute projection 13 is to be formed. The probe 11 was composed of tungsten, as in the observing apparatus explained above, and was sharpened by electrolytic polishing, with a radius of curvature of about 0.1 microns at the end. The end portion of the probe 11 thus prepared by electrolytic polishing was then covered with gold, with a thickness of about 10 nanometers, by an ion beam sputtering apparatus.

Figure 6B:
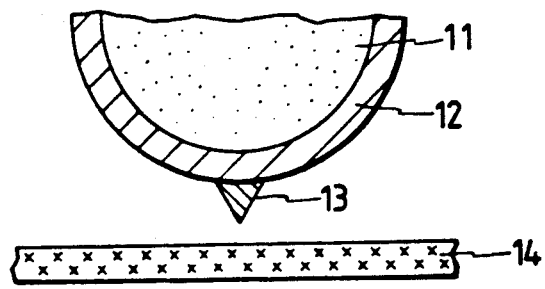

The high-density record/reproducing apparatus of the present embodiment is operated in the air. In order to maintain the distance between the probe 11 and the probe regenerating medium 14 at a constant value of several nanometers, an electric feedback signal is given to the vernier cylindrical piezoelectric element 11 through the current-voltage converter 25, logarithmic converter 26, comparator 27, integrator 28 and amplifier 30, with a voltage of 100 mV supplied by the bias power source 21. The displacement of said piezoelectric element 11 is 1 micron per 1 kV. Tunnel current was utilized for detecting the distance between the probe 11 and the probe regenerating electrode 14 or the recording medium 15. With said electric feedback given to the vernier cylindrical piezoelectric element 17, a pulse with conditions of a duration of 4 microseconds and a height of 4 V was given by the pulse power source 22 to form a minute projection 13 as shown in FIG. 6B, with a height of 10 nanometers and an area of 15 nm$^2$ at the base.

As in the foregoing embodiments, the distance between the probe 11 and the medium is precisely maintained at a predetermined value owing to the electric feedback control providing a constant tunnel current, and the shape of the minute projection can be made precisely constant by repeating said control at each formation or regeneration of the probe.

After the formation of the minute projection 13 on the end of the probe 11 in the above-explained manner, the distance between the probe 11 and the probe regenerating electrode 14 is widened to about 5 microns by means of the coarse movement piezoelectric element 18 (displacement: 10 microns per 100 V) and the coarse (generous) movement control circuit 32. Then the rotary specimen support table 16 is rotated by 180° by means of the rotating mechanism 19 and the position control means 33 so as that the specimen 15 is opposed to the probe 11, and the coarse movement piezoelectric element 18 and the vernier cylindrical control, with detection of the tunnel current, in such a manner that the distance between the minute projection 13 and the specimen 15 is maintained at about several nanometers. The current in this state was 100 pA. The recording and reproduction can be conducted in this state. The recording is conducted by moving the probe 11 to an arbitrary position by the three-dimensional scanning circuit 31, and applying, between the minute projection 13 and the recording medium 15, a voltage of a pulse duration of 1 microsecond and a height of 2 volts, exceeding a threshold value of 1.5 V for the electric memory effect, utilizing the pulse power source 22, whereby an on-state (with a current more than 1000 times larger than that of off-state) could be recorded on the recording medium 15. Said on-state could be reproduced by retracing said record position.

In the course of recording and reproduction, the minute projection 13 at the end of the probe 11 was damaged by contact with the recording medium 15 and lost the resolving power of atomic or molecular level, so that it became necessary to regenerate the end portion of the probe 11. Thus there was required a process for regenerating the minute projection 13 at the end of the probe 11. For this purpose the distance between the probe 11 and the recording medium 15 was widened to about 5 microns by the coarse movement piezoelectric element 18, and the rotary specimen support table 16 was rotated 180° by the rotating mechanism 19 to bring the probe regenerating electrode 14 to a position opposed to the probe 11. In this state the minute projection 13 could be regenerated by pulse voltage application in the same manner as in the initial formation of the minute projection 13.

A high-density record/reproducing apparatus with a probe regenerating function could thus be obtained with the above-explained components, materials and electric circuitry.

The above-explained embodiment employs a recording medium 15 consisting of 8 LB films of squalirium-bis-6-octylazulene superposedly deposited on a graphite substrate, but there may be employed any recording medium (layer) that can be recorded and erased, and the method of preparing the recording medium is not limited by the foregoing description.

Also in the above-explained embodiment, the pulse for probe regeneration was defined by a height of 4 V and a duration of 4 microseconds, but these parameters are suitably selectable according to the materials of the probe covering and the probe regenerating electrode, and are not limited to those described in the present embodiment.

5TH AND 6TH EMBODIMENTS

Figure 7:
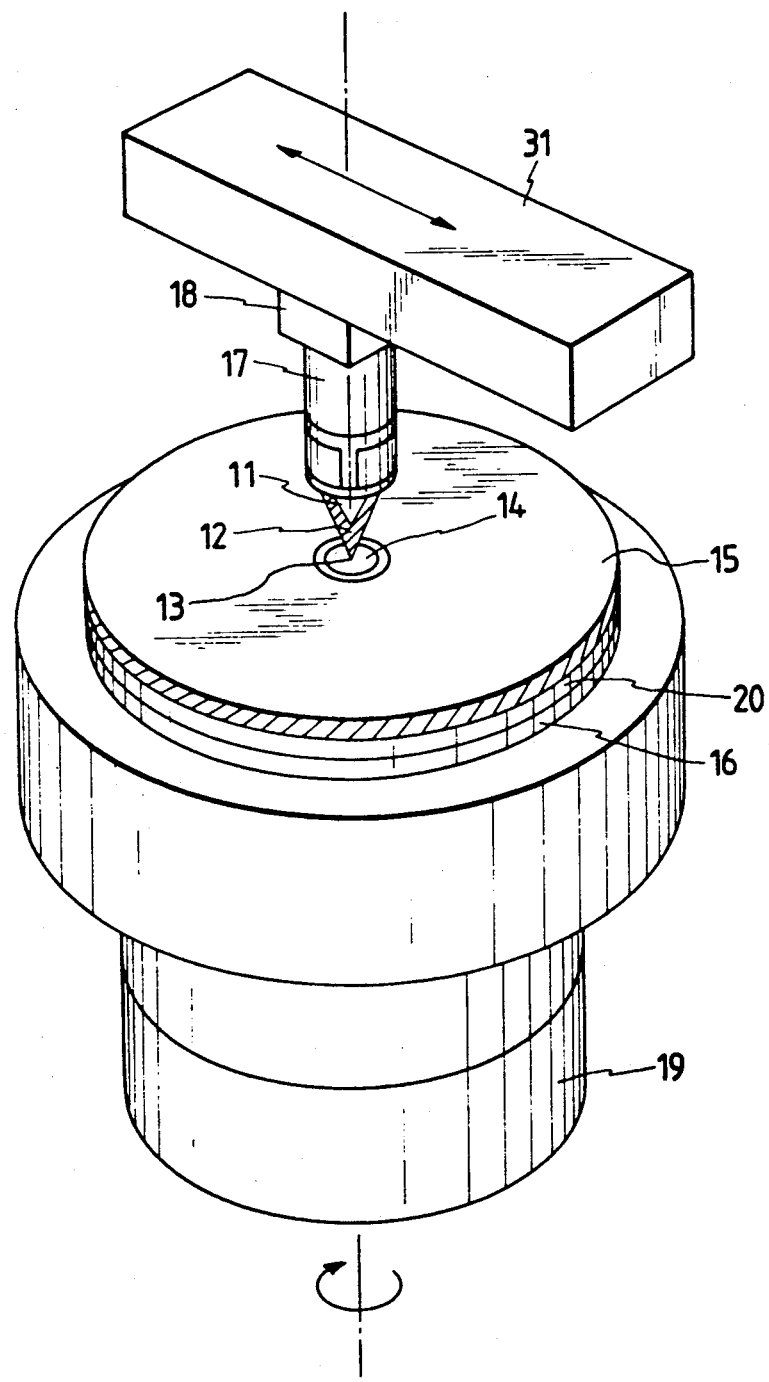
FIGS. 7 and 8 are perspective views of record/reproducing apparatus constituting 5th and 6th embodiments of the present invention.
Figure 8:
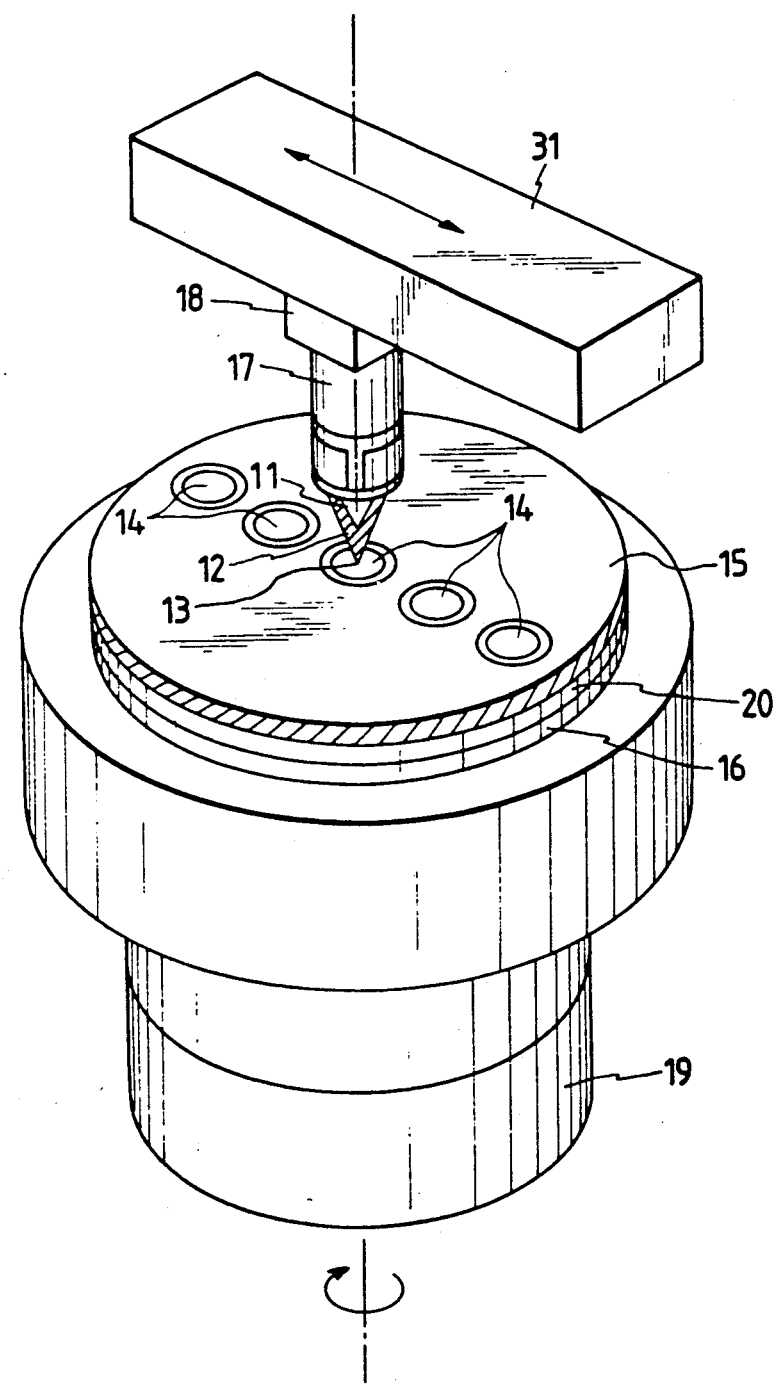

In the following, 5th and 6th embodiments of the present invention will be explained with reference to FIGS. 7 and 8. FIG. 7 shows an embodiment in which the probe regenerating electrode 14 is provided in a position in the recording medium 15, while FIG. 8 shows an embodiment in which probe regenerating electrodes 14 are provided in radial direction. In FIGS. 7 and 8 there is provided a monoaxial stage 31 for moving the probe 11 in excess of the radius of the recording medium 15. These embodiments employ the disk drive method for recording onto the recording medium 15, and provide improvements in the position of the probe regenerating electrode(s) in case of concentric or spiral recording on the recording medium 15 for achieving a high-speed and high-density recording. In FIG. 7, the probe regenerating electrode 14 is positioned at the center of the recording medium, while, in FIG. 8, the probe regenerating electrodes 14 are positioned in the radial direction including the center of medium. The formation and regeneration of the minute projection 13 in said 5th and 6th embodiments were conducted with the same method and conditions as in the 4th embodiment. Also the recording method and conditions on the recording medium 15 are same as those in the 4th embodiment.

As explained in the foregoing, the 4th to 6th embodiments allow to prevent deterioration or damage of the end portion of the probe and to regenerate it within the high-density record/reproducing apparatus simply adding a pulse applying circuit, a probe regenerating medium and a prove covering material thereto, thereby providing significant advantages of simplifying the manufacture of the apparatus and improving the stability and reliability of recording and reproduction.

7TH EMBODIMENT

Figure 9:
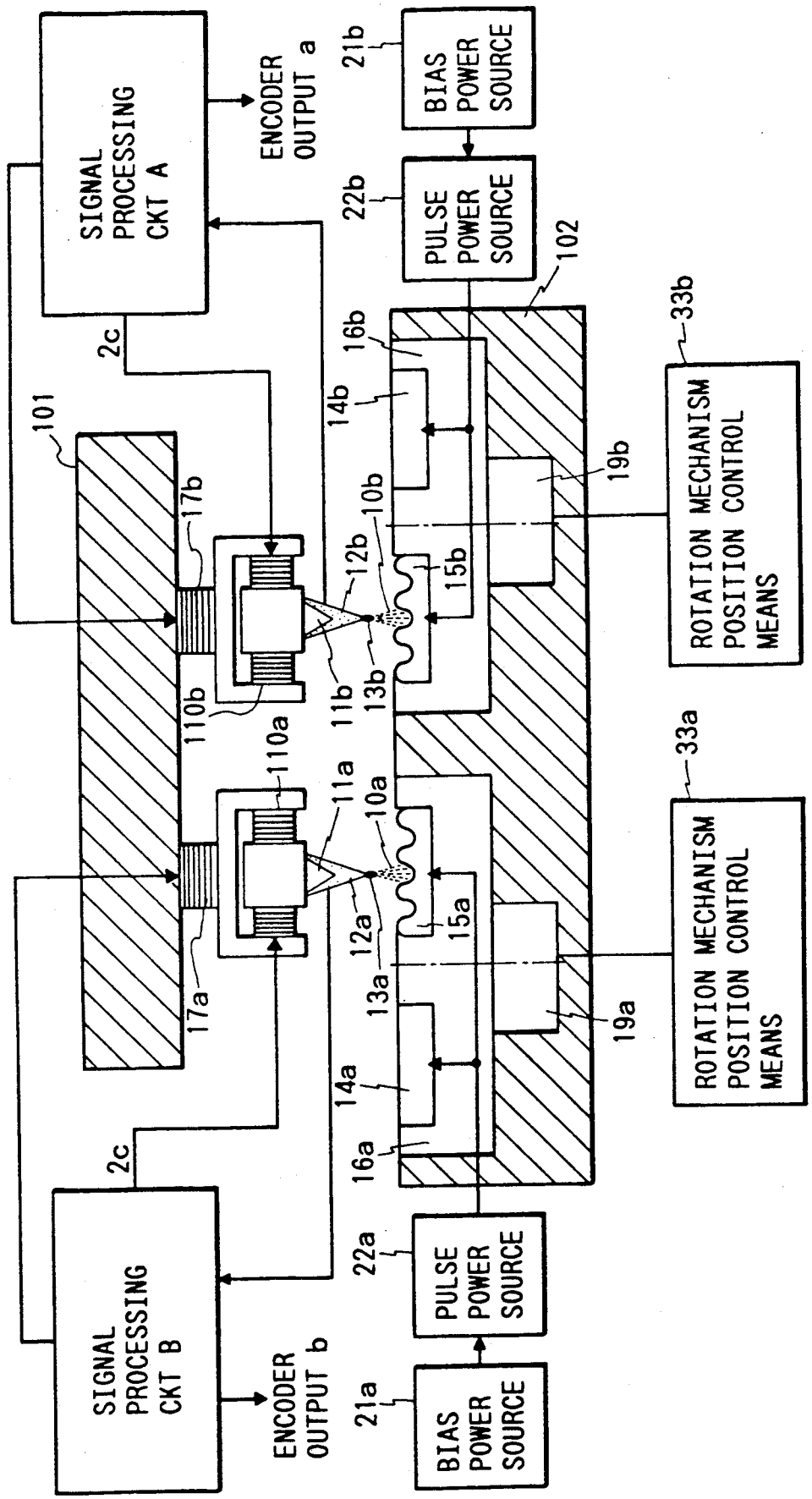
FIG. 9 is a schematic diagram of an encoder relying on the detection of plural tunnel currents, constituting a 7th embodiment of the present invention.
Figure 10B:
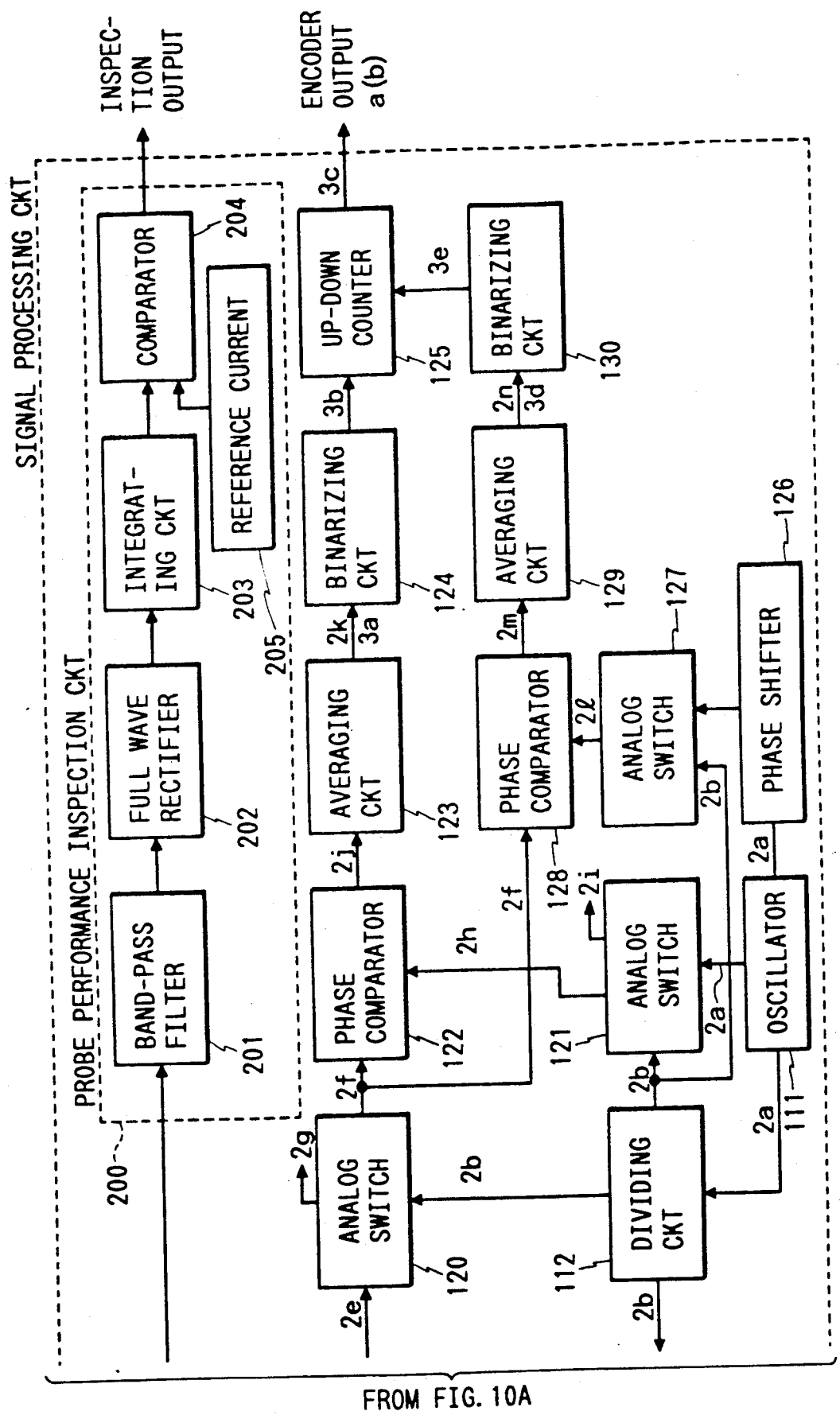
FIG. 10 (10a with 10b) is a block diagram of a signal processing circuit of the apparatus shown in FIG. 9.

FIG. 9 shows the structure of an encoder constituting a 7th embodiment of the present invention, and FIG. 10 is a block diagram common to signal processing circuits A and B shown in FIG. 9.

Referring to FIG. 9, members 101 and 102 are rendered capable of mutual displacement only in the lateral direction (along the plane of drawing). The member 101 is provided with two probe electrodes 11a, 11b which are provided, on the surface thereof, with coverings 12a, 12b and minute projections 13a, 13b (of which method of preparation will be explained later). The member 102 supports reference scales 15a, 15b and probe regenerating electrodes 14a, 14b, on specimen table 16a, 16b rotated by rotating mechanisms 19a, 19b. Bias voltages are applied between the minute projections 13a, 13b formed on the ends of the probes 11a, 11b and the reference scales 15a, 15b, by means of bias power sources 21a, 21b. The ends of said minute projections 13a, 13b are maintained so close to the reference scales 15a, 15b that tunnel currents can flow therebetween.

The tunnel currents 10a, 10b obtained at the minute projections 13a, 13b are supplied to signal processing circuits A, B shown in FIG. 10, converted into voltages by current-voltage converters 107, amplified by amplifiers 108 and subject to logarithmic conversion by logarithmic converters 109.

The two probes 11a, 11b are given a vibration of a frequency f and an amplitude d, in the relative displacing direction of the members 101 and 102, by means of probe vibrating means 110a, 110b. A probe vibrating signal is obtained by converting a square wave 2a of a frequency nf from an oscillator 111 into a triangular wave of a frequency f by means of a frequency dividing circuit 112 and wave form converting circuits 112a, 112b, and is supplied, after amplification by an amplifier 114 (signal 2c), to the probe vibrating means 110a, 110b. Instead of the vibration of the probes 11a, 11b, the vibration may be applied to the reference scales 15a, 15b by suitable vibrating means provided on the member 102.

Also in the lateral relative movement of the members 101 and 102, the distance between the probe and the reference scale is so controlled that the average distance therebetween becomes constant (the average of detected tunnel current becomes constant), by detecting the output signal of the logarithmic converter 109 and activating vertical probe position control means 17a, 17b through a feedback loop composed of an average tunnel current setting circuit 115, a low-pass filter 116 and an amplifier 117 for releasing the difference between said output signal and a preset value. The cut-off frequency of said low-pass filter 115 is so selected as to eliminate rapid changes in the tunnel current generated by lateral vibration of the probe on the reference scale but transmit slow changes in the tunnel current induced for example by the eventual inclination of the reference scale in the lateral mutual displacement of the members 101 and 102.

Because of the vibration of the probes by the vibrating means 110a, 110b, the tunnel currents 10a, 10b flowing between the probes and the reference scales show modulated components of a frequency $(2d/p)f$ induced by the scanning of the probes over the reference scales, wherein p is the pitch of the reference scales. When the members 101 and 102 are mutually displaced in the lateral direction, said modulated components of the frequency $(2d/p)f$ appearing in the tunnel currents 10a, 10b become displaced in phase with respect to a reference signal (for example probe vibrating signal). As a cycle of the signal (phase shift of $2\pi$) corresponds to a lateral mutual displacement between the probe and the reference scale, by a pitch thereof, the amount of lateral mutual displacement between the member 101 and 102 can be detected by the detection of said phase shift.

Figure 11:
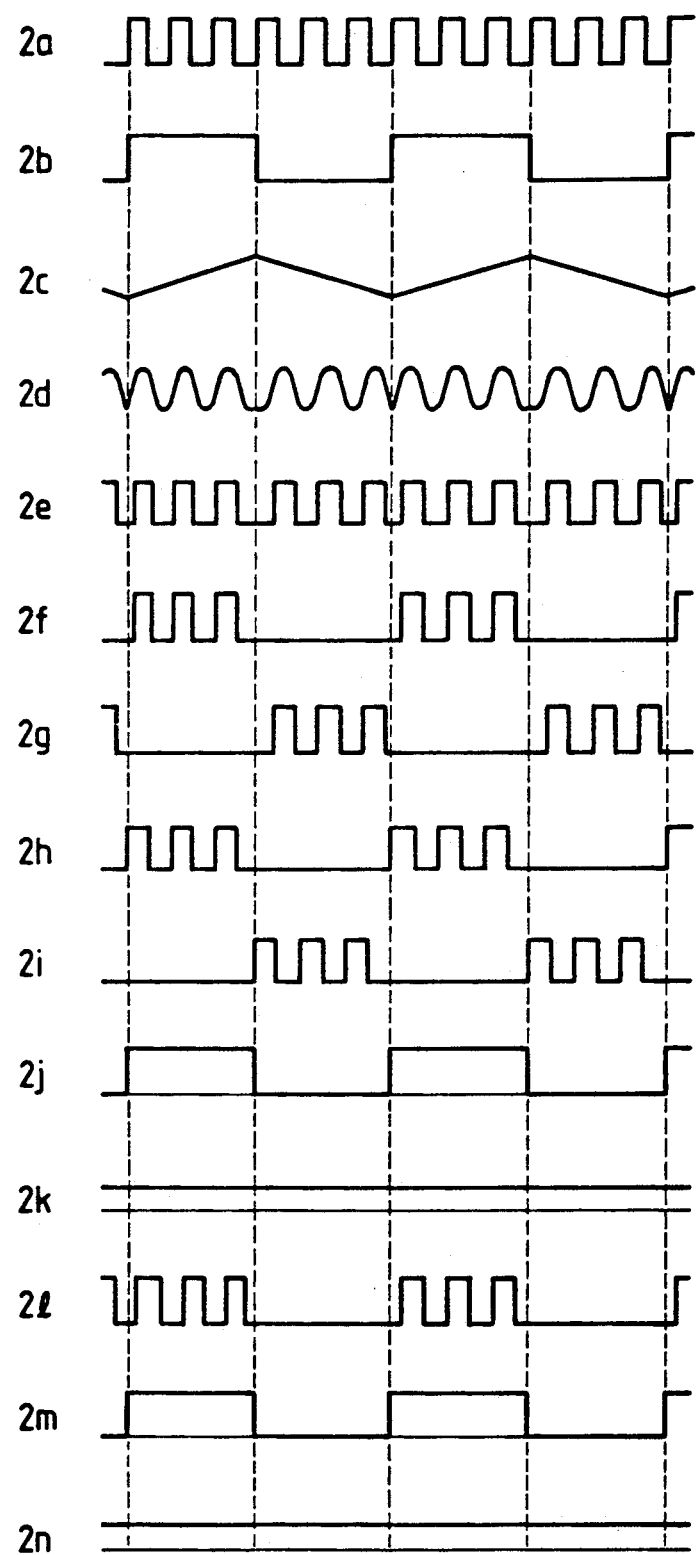
Figure 12:
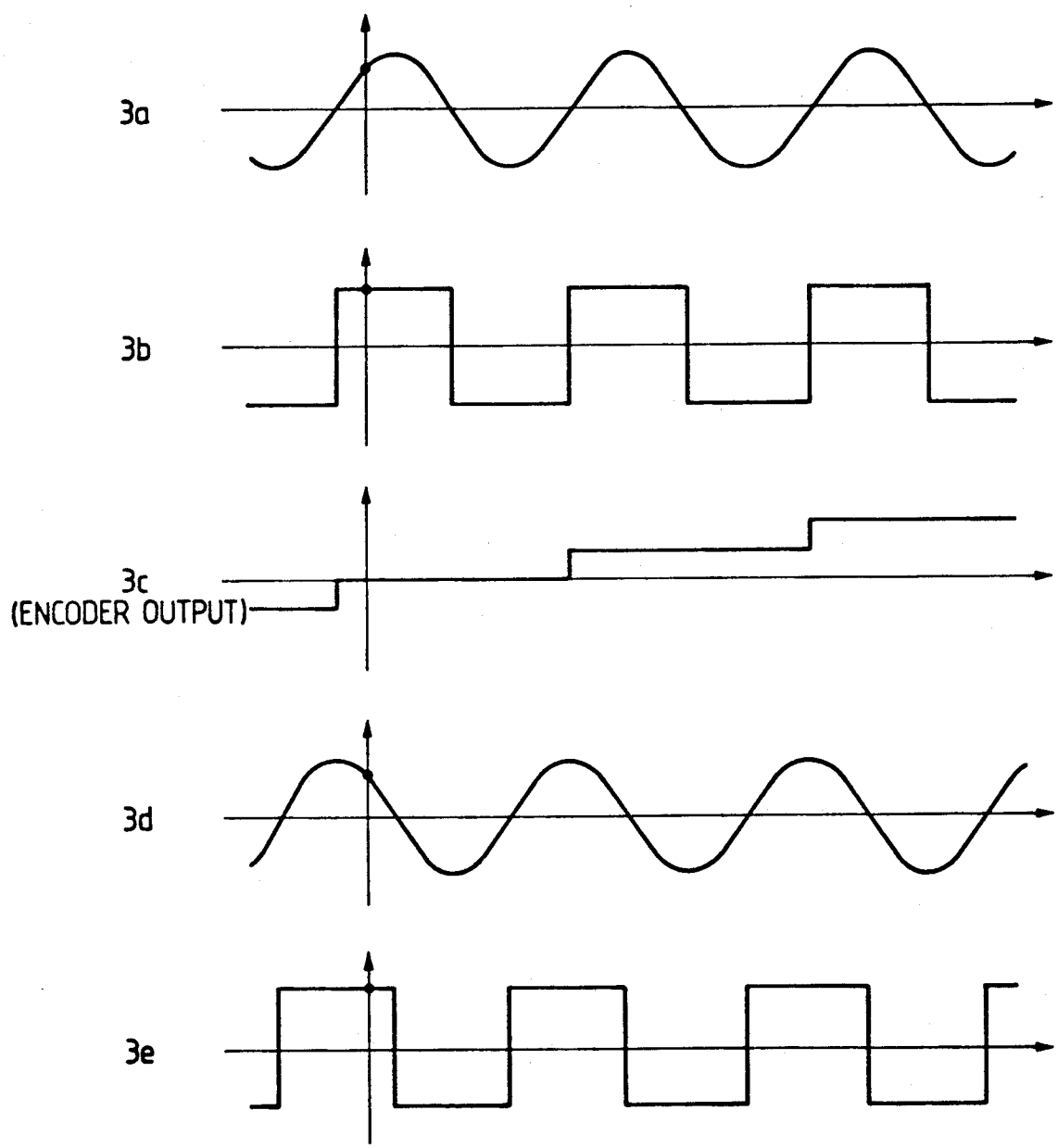

In the following there will be explained the function of the signal processing circuit shown in FIG. 10, while making reference to FIGS. 11 and 12.

The modulated component of frequency $(2d/p)f$ appearing in the tunnel current is taken out by a current-voltage converter 107, an amplifier 108, a logarithmic converter 109 and a band-pass filter 118 (signal 2d), and is digitized by a binary digitizing circuit 119 into a binary signal 2e. The amplitude of the probe vibrating signal 2c supplied to the probe vibrating means 110 (gain of amplifier 114) is so regulated as to satisfy a condition $d = 2p/n$, thereby bringing the frequency of the signal 2e to nf. Then the signal 2e is separated into two signals 2f and 2g by means of an analog switch 120, utilizing a signal 2b, obtained by dividing the frequency of the signal 2a from the oscillator 111 into 1/n by a frequency divider 112, as a reference signal.

Also, the signal 2a is separated into two signals 2h and 2i by means of an analog switch 121, utilizing said signal 2b as a reference signal.

The signal 2f and 2h are supplied to a phase comparator 122, and a phase difference output signal 2j obtained therefrom is averaged by an averaging circuit 123 to obtain a signal 2k.

The relative phase shift between the signals 2f and 2h can be detected, for example, by detecting the zero-cross points of the phase difference output signal 2k (or 3a enlarged in abscissa) by a binary digitizing circuit 124, thereby generating a pulse (signal 3b) for each phase difference of $2n\pi$ (n : integer), and counting thus generated pulses by an up-down counter 125.

A phase shift direction signal, indicating the up-down condition (sign) and supplied to the counter 125 is obtained in the following manner. A signal 2l, shifted by 90° in phase from the signal 2h, is formed by a phase shifter 126 and an analog switch 127, from the output signal 2a of the oscillator 111. The signals 2f and 2l are supplied to a phase comparator 128, of which phase difference output signal 2m is averaged by an averaging circuit 129 to obtain a signal 2n (3d). Said signal 3d is binary digitized in a binary digitizing circuit 130 to obtain a phase shift direction signal or an up-down input signal 3e for the up-down counter. A count-up or count-down operation is conducted respectively if said signal 3e is positive or negative at the rise of the pulse signal 3b.

The amount of mutual lateral displacement of the members 101 and 102 can be detected in the above-explained manner. A signal 3c indicating said amount of mutual lateral displacement is released as encoder outputs a, b respectively from the signal processing circuits A, B.

In the method employed in the above-explained embodiment, one cycle $(2\pi)$ of phase shift corresponds to a mutual displacement of a pitch of the reference scale. Though not described in the foregoing, the amount of mutual displacement can also be detected by applying similar signal processing to the signals 2g and 2i.

In the following there will be compared the encoder outputs a and b shown in FIG. 9., FIG. 13 illustrates the signals 3a, 3e and 3c in each of the signal processing circuits A and B. As the reference scales 15a, 15b opposed to the minute projections 13a, 13b are mutually identical, the encoder outputs a and b should be mutually identical in wave form. However, in FIG. 13, the signals of the processing circuit B show non-periodicity at a position X. This indicates that the minute projection 13b has become inadequate as a probe for the encoder with resolving power of atomic level at said position X, for example by a damage resulting from an eventual contact.

The performance of the probe is identified by a probe performance inspection circuit 200, shown at the upper right corner in FIG. 10. The inspection is achieved by converting the change in the tunnel current detected from the probe 11a or 11b into an electrical signal by a current-voltage converter 107, an amplifier 108 and a logarithmic converter 109, obtaining, from thus obtained signal 4a, a modulated component of a frequency of $(2d/p)f_1$ by a band-pass filter 201, rectifying said component with an all-wave rectifying circuit 202, averaging the obtained signal with an integrator 203, and comparing the averaged signal in a comparator 204 with a predetermined reference signal, indicating the performance of the probe, supplied from a reference source 205. If there is a difference between both signals, the probe is identified inadequate and a corresponding inspection output is released. The damage at the end of the minute projection 13a or 13b can be identified from said inspection output.

The length measurement is still conducted by the minute projection 13a and the reference scale 15a without interruption, but, it is necessary to regenerate the already damaged minute projection 13b, since the end portion of the probe 11a might also be damaged at any moment.

The regenerating operation will be explained in the following. In the present example, as the end portion of the minute projection 13b is damaged, the regenerating mechanism at the left side in FIG. 9 is utilized. The encoder mechanism at the right side may continue the length measuring operation. At first, since the minute projection 13b and the reference scale 15b are positioned at such a small distance as to generate a tunnel current therebetween, the probe 11b is retracted by the vertical probe position control means 17b from the reference scale 15b. Then the specimen table 16b, supporting the reference scale 15b and the probe regenerating electrode 14b is rotated by 180° by the rotating mechanism 19b and the position control means 33b in such a manner that said probe regenerating electrode 14b is opposed to the minute projection 13b. The retracted probe 11b, having the minute projection 13b at the end thereof, is brought closer to the probe regenerating electrode 14b to a distance generating a tunnel current therebetween. In this state, the distance between the probe 11b and the electrode 14b is controlled at a predetermined value by means of the aforementioned feedback loop, and the minute projection 13b is formed again by the pulse power source 22b. After the re-formation of the minute projection, it is retracted again, then the reference scale 15b is brought to a position opposed to the minute projection 13b, and the minute projection 13b is brought close to said reference scale 15b until a tunnel current is induced therebetween. The damaged end portion of the probe can be regenerated in the above-explained manner.

As explained in the foregoing, the present embodiment provides an encoder with greatly improved reliability, as an eventually damaged probe can be regenerated and the length measurement can still be continued even during said regeneration by means of the other probe whereby the length measurement can be achieved in precise manner.

Figure 14A:
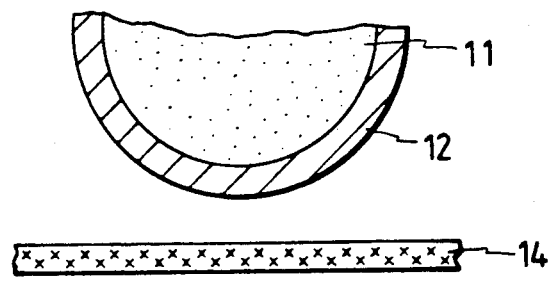
FIGS. 14A and 14B are views showing the principle of probe formation in the 7th embodiment.
Figure 14B:
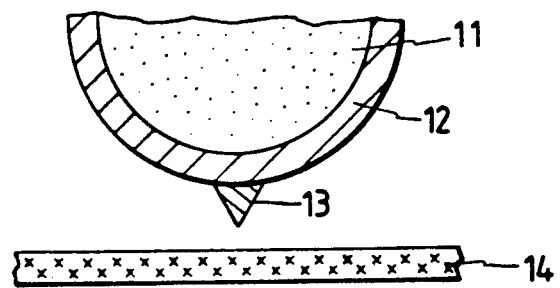

The method forming of the minute projection 13 (13a or 13b) employed in the present embodiment will be explained in greater detail in the following, with reference to FIGS. 9 and 14.

The probe regenerating electrode 14 (14a, 14b) of the present embodiment was composed of a platinum evaporated film, deposited on a Corning 7059 glass substrate, by an ion beam sputtering apparatus. The probe 11 (11a, 11b) was composed of tungsten, sharpened at the end by ordinary electrolytic polishing, with a radius of curvature of about 0.1 microns at the end. The end portion of thus prepared probe 11 was covered with gold, with a thickness of about 15 nanometers, by an ion beam sputtering apparatus. The end portion of said probe 11 was positioned very close to the probe regenerating electrode 14 in such a manner that a tunnel current was induced therebetween. In this state the distance of the two was precisely controlled at a predetermined value by means of the detected tunnel current, and a pulse with a duration of 4 microseconds and a height of 4 V was applied between the probe 11 and the probe regenerating electrode 14 by means of the pulse power source 22a, 22b, thereby forming a minute projection 13 (13a, 13b) as shown in FIG. 9B, of conical shape with a height of 10 nm and a bottom area of 15 nm$^2$. The mechanism of formation of said projection is presumably based on a fact that the material is fused locally and instantaneously by the application of a high pulse voltage, and the fused material is subjected to an attractive force between the probe and said material to form a heap, due to the presence of an electric field between the probe and the electrode. Consequently the materials for the probe, probe covering and probe regenerating electrode are not limited to those described above but can be suitably selected, as long as the melting point of the material of the probe is lower than that of the material of the regenerating electrode.

Though the height and duration of the probe regenerating pulse have been specified in the foregoing description, these parameters are not limited to those described above and can be suitably selected according to the materials of the probe and of the probe regenerating electrode.

As explained in the foregoing, the encoder of the present embodiment, provided with a probe regenerating mechanism therein, is significantly improved in the reliability, in that an eventually damaged probe can be regenerated in an easy manner and without deteriorating the performance of the encoder, thereby overcoming a conventional drawback that the measurement is hindered by the eventual damage of the probe.

What is claimed is:

1. A method for forming a probe for use in an apparatus for effecting information reading and/or information input on an information carrier member by means of said probe positioned close thereto, comprising steps of:

placing an electrode in opposed manner to a part, where the end portion is to be formed, of a probe;

detecting information on the distance between said end portion forming part of the probe and said electrode;

controlling the relative position of said end portion forming part of the probe to said electrode, based on the result of said detection; and applying a voltage to said end portion forming part of the probe through said electrode under said relative position control, thereby forming the end portion of the probe.

2. A method according to claim 1, wherein said end portion forming part of the probe is composed of a conductive material.

3. A method according to claim 1, wherein the melting point of said electrode is higher than that of said end portion forming part of the probe.

4. A method according to claim 1, wherein said end portion forming part of the probe is fused to form a minute projection by said voltage application.

5. A method according to claim 1, wherein said relative position control is conducted in such a manner that said end portion forming part of the probe and said electrode are maintained at a distance capable of flowing a tunnel current.

6. A method for forming a probe for use in an apparatus for effecting information reading and/or information input on an information carrier member by means of said probe positioned close thereto, comprising steps of:
   placing an electrode in opposed manner to a part, where the end portion is to be formed, of a probe;
   detecting information on the distance between said end portion forming part of the probe and said electrode;
   controlling the relative position of said end portion forming part of the probe to said electrode, based on the result of said detection, and
   applying a voltage to said end portion forming part of the probe through said electrode under said relative position control, thereby forming the end portion of the probe,
   wherein said electrode is provided with a projecting part in a position thereof close to said end portion forming part of the probe.

7. An apparatus for forming a probe for use in an apparatus for effecting information reading and/or information input on an information carrier member by means of said probe positioned close thereto, comprising:
   an electrode for applying a voltage to a part, where the end portion is to be formed, of the probe;
   detection means for detecting information on the distance between said electrode and said end portion forming part of the probe;
   position control means for controlling the relative position of said end portion forming part of the probe to said electrode, based on the result of detection by said detection means; and
   probe end portion forming means for forming the end portion of the probe by applying a voltage to said end portion forming part of the probe, under relative position control by said position control means, through said electrode.

8. An apparatus according to claim 7, wherein the melting point of said electrode is higher than that of said end portion forming part of the probe.

9. An apparatus according to claim 7, wherein said probe end portion forming means is adapted to fuse said end portion forming part of the probe by said voltage application, thereby forming a minute projection.

10. An apparatus according to claim 7, wherein said detection means is adapted to detect the tunnel current between said end portion forming part of the probe and said electrode, and said relative position control means is adapted to effect position control in such a manner that said end portion forming part of the probe and said electrode are maintained at a distance capable of flowing a tunnel current.

11. An apparatus for forming a probe for use in an apparatus for effecting information reading and/or information input on an information carrier member by means of said probe positioned close thereto, comprising:
   an electrode for applying a voltage to a part, where the end portion is to be formed, of the probe;
   detection means for detecting information on the distance between said electrode and said end portion forming part of the probe;
   position control means for controlling the relative position of said end portion forming part of the probe to said electrode, based on the result of detection by said detection means; and
   probe end portion forming means for forming the end portion of the probe by applying a voltage to said end portion forming part of the probe, under relative position control by said position control means, through said electrode,
   wherein said electrode is provided with a projecting part in a position thereof close to said end portion forming part of the probe.

12. An apparatus for effecting information reading and/or information input on an information carrier member by a probe positioned close thereto, comprising:
   a probe;
   an electrode for applying a voltage to said probe;
   detection means for detecting information on distance between said electrode and said probe;
   position control means for controlling the relative position of said probe to said electrode, based on the result of detection by said detection means; and
   probe end portion forming means for reforming the end portion of the probe by applying a voltage to said probe, under relative position control by said position control means, through said electrode.

13. An apparatus according to claim 12, wherein said detection means is adapted to detect said information on distance, by detecting the tunnel current flowing between said probe and said electrode.

14. An apparatus according to claim 12, wherein said probe end portion forming means is adapted to re-form said end portion of the probe, in a state without heating other than the voltage application to said probe through said electrode.

15. An apparatus according to claim 12, wherein said probe is covered with a conductive material.

16. An apparatus according to claim 12, wherein the melting point of said electrode is higher than that of said probe.

17. An apparatus according to claim 12, wherein said electrode is planar in a position thereof opposed to said probe.

18. An apparatus according to claim 12, wherein said electrode is positioned on a principal plane same as that of said information carrier member.

19. An apparatus according to claim 12, further comprising means for observing the surface shape of a specimen, serving as an information carrier member, through said probe.

20. An apparatus according to claim 12, further comprising means for effecting information recording and/or reproduction on a recording medium, serving as an information carrier member, through said probe.

21. An apparatus according to claim 20, wherein said electrode is positioned in the vicinity of said recording medium.

22. An apparatus according to claim 20, wherein said electrode is positioned within said recording medium.

23. An apparatus according to claim 12, further comprising means for detecting information on a reference scale from scale means having the reference scale serving as an information carrier member through said probe, and measuring relative displacement between said probe and said scale means based on said information on reference scale.

24. An apparatus for effecting information recording and/or reproduction on a recording medium, through a probe positioned close thereto, comprising:

a probe;

detection means for detecting information on distance between said probe and an electrode formed on the side of said recording medium;

position control means for controlling relative position of said probe to said electrode, based on the result of detection by said detection means; and probe end portion forming means for reforming the end portion of said probe by a voltage application to said probe, under relative position control by said position control means, through said electrode.

25. An apparatus for forming a probe for use in an apparatus for effecting information reading and/or information input on an information carrier member by means of said probe positioned close thereto, comprising:

an electrode for applying a voltage to a part, where the end portion is to be formed, of the probe;

a detection circuit for detecting information on the distance between said electrode and said end portion forming part of the probe;

a control circuit for controlling the distance of said end portion forming part of the probe to said electrode, based on the result of detection by said detection circuit, said control circuit controlling in such a manner that said end portion forming part of the probe and said electrode are maintained at a predetermined distance; and a probe end portion forming system for forming the end portion of the probe by applying a voltage to said end portion forming part of the probe, under distance control by said control circuit, through said electrode;

said control circuit being able to control so that the end portion forming part of every probe to be formed and said electrode are maintained at said predetermined distance.

26. An apparatus according to claim 25, wherein said detection circuit is adapted to detect the tunnel current between said end portion forming part of the probe and said electrode, and said control circuit is adapted to effect distance control in such a manner that said end portion forming part of the probe and said electrode are maintained at a distance capable of flowing a tunnel current as said predetermined distance.

* * * * *

UNITED STATES PATENT AND TRADEMARK OFFICE
CERTIFICATE OF CORRECTION

PATENT NO. : 5,132,533
DATED : July 21, 1992
INVENTOR(S) : TOSHIMITSU KAWASE ET AL.          Page 1 of 2

It is certified that error appears in the above-identified patent and that said Letters Patent is hereby corrected as shown below:

ON THE TITLE PAGE,
AT [57] ABSTRACT:

"prove" should read --probe--.

COLUMN 6

Line 48, "enlargedly" should read --enlarged--.

COLUMN 7

Line 54, "as" should be deleted.

COLUMN 9

Line 35, "as" should be deleted.
Line 37, "cylindrical control," should read
--cylindrical piezoelectric element 17 are activated to effect electric control,--.

COLUMN 10

Line 51, "apparatus" should read --apparatus by--.
Line 53, "prove" should read --probe--.

COLUMN 12

Line 57, "FIG. 9.," should read --FIG. 9.--.

COLUMN 13

Line 52, "again," should read --again;--.

UNITED STATES PATENT AND TRADEMARK OFFICE
CERTIFICATE OF CORRECTION

PATENT NO. : 5,132,533
DATED : July 21, 1992
INVENTOR(S) : TOSHIMITSU KAWASE ET AL.

It is certified that error appears in the above-identified patent and that said Letters Patent is hereby corrected as shown below:

COLUMN 14

Line 28, "Consequently" should read --Consequently,--.

COLUMN 15

Line 24, "detection," should read --detection;--.

COLUMN 18

Line 17, "electrode;" should read --electrode,--.
    Line 18, "said" should read --wherein said--.

Signed and Sealed this

Twelfth Day of October, 1993

Attest:

BRUCE LEHMAN

*Attesting Officer*     *Commissioner of Patents and Trademarks*